UNITED STATES PATENT OFFICE.

EUGENE VON VARGYAS, OF WASHINGTON, DISTRICT OF COLUMBIA, ASSIGNOR, BY MESNE ASSIGNMENTS, TO JACOB G. KEENER AND E. R. SHUPE, TRUSTEES.

RUBBER COMPOUND.

1,246,192.

Specification of Letters Patent.

Patented Nov. 13, 1917.

No Drawing. Application filed June 24, 1915, Serial No. 36,054. Renewed July 30, 1917. Serial No. 183,639.

*To all whom it may concern:*

Be it known that I, EUGENE VON VARGYAS, a subject of the King of Hungary, residing at Washington, in the District of Columbia, have invented certain new and useful Improvements in Rubber Compounds, of which the following is a specification.

This invention relates to compositions of the type commonly called rubber compounds. In compositions of this character, it is desirable to provide a strengthening means which will add to the life of the compound when in use, such as in the outer shoes of pneumatic tires and will thereby greatly reduce the cost of upkeep of devices of such character.

To this end one principal object of the invention is to provide a rubber compound which not only possesses requisite resiliency but also has an extremely high degree of wearing quality so that it is peculiarly adapted for use in the outer shoes of pneumatic tires.

Furthermore in such compositions, it is desirable to keep the rubber content down to as low a degree as possible, it being of course necessary to keep the rubber content sufficiently high to insure proper resiliency and binding of the remainder of the ingredients together.

A second highly important object of the invention is, therefore, to provide a rubber compound wherein the rubber content will be in the lowest possible proportion with respect to the entire compound.

I have also discovered that a very highly efficient filler or base for such a compound is the ordinary slag from blast or other iron furnaces in granulated form, the slag being otherwise called vitrified cinder and consisting largely of silicate of lime in a more or less impure form.

A third principal object of the invention is therefore to produce a rubber compound wherein granulated slag will be used as the filler or base.

In the manufacture of the improved compound I prefer to use, for each twelve ounces of rubber in its uncured state, one and three-tenths to three and seven-tenths ounces of dry cork in granulated form, commonly called cork flour, and from twelve and one-fourth to twenty-one and one-half ounces of iron slag in granulated form. In the manufacture of the compound I reduce the rubber to a plastic state by the application of a proper degree of heat and proper maceration and washing, and then place this rubber in a suitable mixer adding thereto the desired quantity of cork and slag. After a thorough mixing, the mass is placed in a mold and vulcanized in the ordinary manner.

It will be understood that wherever, in the appended claims, iron slag is mentioned, it is to be taken as including the vitrified cinder above mentioned.

What I claim as new is:—

1. As a new article of manufacture, a rubber compound consisting of rubber, granulated iron slag and cork flour, the quantity of rubber in the compound by weight being less than the combined weights of the iron slag and cork flour.

2. As a new article of manufacture, a rubber compound consisting of twelve ounces of rubber in its uncured state, from one and three-tenths to three and seven-tenths ounces of dry cork flour, and twelve and one-fourth to twenty-one and one-half ounces of iron slag in granulated form.

In testimony whereof I affix my signature.

EUGENE VON VARGYAS.